US010581556B1

United States Patent
Dizdar et al.

(10) Patent No.: US 10,581,556 B1
(45) Date of Patent: Mar. 3, 2020

(54) UPLINK MULTIPLE ACCESS METHOD BASED ON FROZEN BIT PATTERNS OF POLAR CODES

(71) Applicant: ASELSAN ELEKTRONIK SANAYI VE TICARET ANONIM SIRKETI, Ankara (TR)

(72) Inventors: Onur Dizdar, Ankara (TR); Çağri Göken, Ankara (TR); Alptekin Yilmaz, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 16/281,112

(22) Filed: Feb. 21, 2019

(30) Foreign Application Priority Data

Oct. 25, 2018 (TR) ................................. 2018/15967

(51) Int. Cl.
*H04L 1/00* (2006.01)
*H04L 1/06* (2006.01)
*H04B 1/00* (2006.01)

(52) U.S. Cl.
CPC .......... *H04L 1/0048* (2013.01); *H04L 1/0009* (2013.01); *H04L 1/0042* (2013.01);
(Continued)

(58) Field of Classification Search
CPC ... H04L 1/0048; H04L 1/0009; H04L 1/0042; H04L 1/0625; H04L 1/0643
See application file for complete search history.

(56) References Cited

U.S. PATENT DOCUMENTS

2018/0167946 A1* 6/2018 Si ..................... H04W 72/005
2018/0198467 A1 7/2018 Nammi et al.
(Continued)

FOREIGN PATENT DOCUMENTS

WO 2017106246 A2 6/2017

OTHER PUBLICATIONS

Çağri Göken et al: "Evaluation of 5G New Radio Non-orthogonal Multiple Access Methods for Military Applications", https://arxiv.org/abs/1805.01125, May 3, 2018.

*Primary Examiner* — Kabir A Timory
(74) *Attorney, Agent, or Firm* — Bayramoglu Law Offices LLC

(57) ABSTRACT

An uplink multiple access method based on the user-specific frozen bit patterns of polar codes assigned to users and relevant transmitter-receiver embodiments. The method includes encoding the information bits with a polar encoder by using the binary-valued, user-specific frozen bit patterns in frozen bit locations during encoding operation. The method further includes mapping of coded bits with symbols to be transmitted and baseband-to-RF processing performed on the symbol sequence. The generated signals of each user are transmitted by using the same time-frequency resources. The method further includes to receive the superposed signal of multiple users transmitted by means of relevant uplink radio channels. The method further includes an RF-to-baseband conversion on the received signal and detecting and decoding each user data by using an interference cancellation multiuser detector and a polar decoder that uses binary-valued pattern sequences assigned to the users in the frozen bit locations.

2 Claims, 5 Drawing Sheets

(52) U.S. Cl.
CPC .......... *H04L 1/0625* (2013.01); *H04L 1/0631* (2013.01); *H04L 1/0643* (2013.01); *H04B 1/0028* (2013.01)

(56) References Cited

U.S. PATENT DOCUMENTS

2019/0097756 A1* 3/2019 Chatterjee ............. H04L 5/0044
2019/0238159 A1* 8/2019 Gritsenko ............. H03M 13/13

* cited by examiner

UPLINK MULTIPLE ACCESS METHOD BASED ON FROZEN BIT PATTERNS OF POLAR CODES

CROSS REFERENCE TO THE RELATED APPLICATIONS

This application is based on and claims priority Turkish Patent Application 2018/15967, filed on Oct. 25, 2018, the entire content of which is incorporated herein by reference.

STATEMENT REGARDING PRIOR DISCLOSURES BY THE INVENTOR

The following disclosures are submitted under 35 U.S.C. 102(b)(1)(A):
A "grace period disclosure" was published on May 3, 2018 by Cornell University. This publication was entitled "Evaluation of 5G New Radio Non-orthogonal Multiple Access Methods for Military Applications". The Cornell University obtained the subject matter directly from the inventors not more than one year before the effective filing date of the instant application.

TECHNICAL FIELD

The invention is related to the field of communication and particularly to uplink multi-user communication methods and devices.

BACKGROUND

Uplink multi-user access in today's wireless communication systems can be performed by means of different multiple access methods. Frequency Division Multiple Access (FDMA), Time Division Multiple Access (TDMA), Code Domain Multiple Access (CDMA) and Orthogonal Frequency Division Multiple Access (OFDMA) have been utilized in various communication systems. The uplink multiple access methods might be orthogonal or non-orthogonal as well. The users can share the resources in an orthogonal manner in frequency, time or code domain the orthogonal multiple access (OMA) schemes; on the other hand, the non-orthogonal multiple access (NOMA) schemes are based on the idea that multiple users share the same resource blocks as time slot, subcarrier group by means of non-orthogonal resource allocation.

Modern wireless communication systems aim to provide higher spectral efficiency, increased connectivity density and lower latency compared to prior ones. OMA schemes might not be sufficient to support some of these demands, as the number of orthogonal resources might limit the number of supported users in the network. Main motivation behind non-orthogonal multiple access (NOMA) is to increase system capacity by utilizing the resources more efficiently and/or provide enhanced connectivity. In particular, NOMA schemes are considered for service scenarios such as Internet of Things (IoT) and massive Machine Type Communications (mMTC) which require the connection of massive number of low-cost and energy efficient devices sending sparse and small packets in the uplink communications, possibly in a grant-free manner.

Generally, NOMA is a technique which allows a central unit, such as a base station, to communicate with more users than the number of orthogonal resources in the uplink scenario. Many novel NOMA technologies have been proposed. Some of the example schemes are Sparse Coded Multiple Access (SCMA), Pattern Division Multiple Access (PDMA), Multi-User Shared Access (MUSA), Repetition Division Multiple Access (RDMA) and Interleave Division Multiple Access (IDMA). Said methods are based on the common idea of superposing different user signals in the same orthogonal resources in a controlled manner and then recover the signals by using advanced receiver embodiments.

To limit the multi-user interference and distinguish between users, user specific signatures or patterns are considered. The abovementioned NOMA methods can be categorized based on which type of signatures are used, which can be power-domain or in modulation and symbol level processing including spreading, repetition, interleaving and codebook mapping. For example, the users' information can be separated by distinct user-specific codebooks, spreading codes, interleavers, feature and cyclic shift repetition patterns for SCMA, MUSA, IDMA, PDMA and RDMA, respectively.

NOMA is the potential access scheme for communication scenarios in which there are many users and bandwidth is required to be used efficiently. An example is the satellite communications, in which the efficient use of bandwidth becomes more and more necessary with the increasing number of terminals and unmanned aerial vehicles (UAVs) using the satellite links. Especially, using NOMA schemes for channel requests and synchronization signaling would be a more efficient alternative to OMA and/or dynamical channel allocation methods by reducing delay and overhead. Another example is ad-hoc sensor networks, in which the sensors can be used in applications such as border safety and threat detection. In tactical area/ad-hoc communications, the increased number of connected radios in a network lead to a clustering-based network structure rather than a flat network. For the uplink communications inside the cluster, members can send packets to the cluster-head by NOMA schemes, which will potentially increase the total spectral efficiency and simplify the link scheduling algorithms. Furthermore, contention-based access methods used for channel allocation requests in tactical area/ad-hoc networks can be replaced by NOMA schemes to allow non-orthogonal access in a more controlled way, which in turn reduces the packet collisions and increases the system capacity.

In state of the art, in non-orthogonal multiple access schemes, we did not come across with a publication that discloses mapping the user specific signatures in frozen bit locations of the polar codes. The frozen bit locations of polar codes are particularly used to map device identity numbers in a communication control channel. For example; in the patent document No US2018198467A1, a wireless communication method in which user device identity number is mapped with frozen bits of the polar codes; information is carried by other bits of the polar codes, is disclosed. Said method is not an uplink multiple access method; it aims to embed the bit values based on the identity numbers of downlink and uplink units to the frozen bits in the communication control channel. In addition, this document does not disclose the usage of frozen bits for improving data transfer performance in an uplink non-orthogonal communication scenario of the units.

Similarly; in the patent document No WO2017106246A2 of the current art, a communication method, in which the frozen bits of the polar codes are mapped with wireless transmitter/receiver device (WTRU) identity number, is disclosed. Said method is not an uplink multiple access method; it only aims to embed bit values based on wireless transmitter/receiver device (WTRU) identity numbers to the frozen bits of the downlink communication units and to make separation between the control formats. In addition, this document does not disclose the usage of frozen bits for improving data transfer performance in an uplink non-orthogonal communication scenario of the units.

An uplink non-orthogonal multiple access method that has a low complexity to provide a grant-free, contention-based communications, is required. This kind of method aims to fulfill the connection requirements of multiple low cost and energy saving devices that sends sparse and small packages in uplink communications, by means of a system with low complexity.

SUMMARY

The present invention comprises of transmitter and receiver embodiments that are constituted by being inspired from the present conditions and aims to operate in the above-mentioned scenarios.

An aim of the invention is to fulfill the connection requirements of multiple low cost and energy saving devices that sends sparse and small packages in an uplink communication.

Other aim of the invention is by favoring this aim previously to design and store the bit patterns within the memory elements that are sent in frozen bits or to produce them according to pre-determined rules at the receiver and transmitter before communication.

The transmitter embodiment of the present invention that fulfills the abovementioned aims comprises the following;
- a pattern generating module (210) providing binary-valued pattern sequence to be used in frozen bit locations during polar encoding,
- a channel encoding module (220) performing channel encoding operation to information bits using a polar encoder,
- a symbol mapping module (230) mapping coded bits to symbols to be transmitted,
- a symbol transmitting module (240) performing baseband-to-RF processing onto the symbol sequence to generate transmitted signal.

Moreover, the receiver of the present invention that fulfills said aims comprises the following;
- a signal reception module (410) receiving the superposed signal of M users transmitted through M uplink radio channels where M>1,
- a baseband conversion module (420) performing the operations for obtaining the baseband superposed signal from received RF signal,
- a signal detection module (430) performing detection and decoding of each user data from baseband signal using an interference-cancellation multi-user detector and a polar decoder.

The structural and characteristic features of the present invention will be understood clearly by the following drawings and the detailed description made with reference to these drawings and therefore the evaluation shall be made by taking these figures and the detailed description into consideration.

Figure 1:
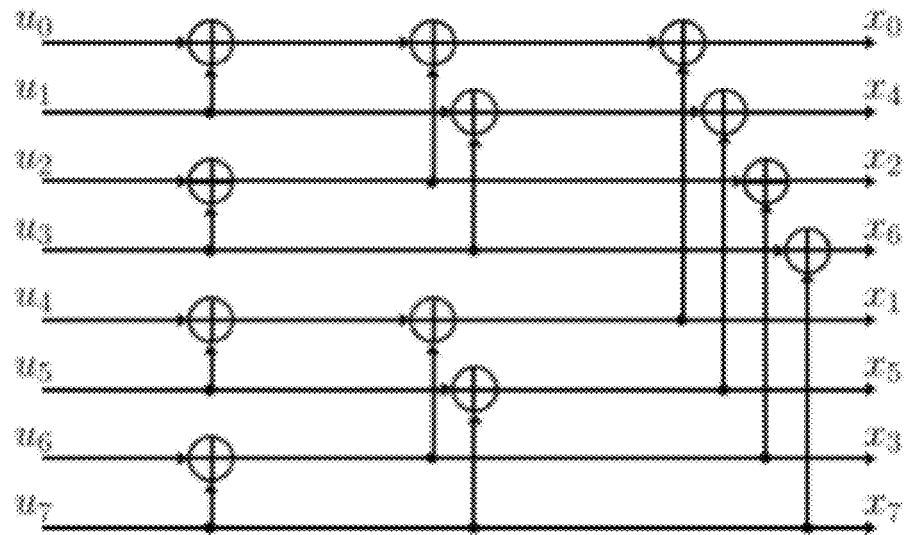
FIG. 1 is a schematic view of the polar coder for N=8.

DESCRIPTION OF THE REFERENCES 110. the step of providing binary-valued pattern sequence to be used in frozen bit locations during polar encoding
120. the step of performing channel encoding operation to information bits using a polar encoder
130. the step of mapping coded bits to symbols to be transmitted
140. the step of performing baseband-to-RF processing onto the symbol sequence to generate transmitted signal
210. pattern generating module
220. channel encoding module
230. symbol mapping module
240. symbol transmitting module
310. the process step of receiving superposed signal of M users transmitted through M uplink radio channels where M>1
320. the process step of performing RF-to-baseband processing onto received signal
330. the process step of performing detection and decoding of each user data from baseband signal using an interference-cancellation multi-user detector and a polar decoder
410. signal reception module
420. baseband conversion module
430. signal detection module

DETAILED DESCRIPTION OF THE EMBODIMENTS

In this detailed description, preferred embodiments of transmitter and receiver related to uplink multiple access of the present invention is described for the sake of clarity.

1. Polar Codes

A possible signature that can be used in an uplink non-orthogonal multiple access method is a binary-valued vector embedded in the frozen bits of the polar codes. Polar coding is a linear block coding method that is proved to achieve Shannon's channel capacity for symmetric binary-input discrete memoryless channel (B-DMC) by Erdal Arikan. Polar coding is selected to be used in control channel of enhanced mobile broadband (eMBB) scenario for 5G.

The block length of a polar code is represented by $N=2^n$, where n is a positive integer. An uncoded bit vector of length N consists of information bits and redundant bits, which are called frozen bits. In polar coding, an uncoded bit vector of length N is input to the polar encoder. The number of information bits is represented by K. The number of frozen bits is represented by N−K. The code rate is represented by R=K/N. An example polar encoder for N=8 is given in FIG. 1.

In polar code construction, the reliabilities of bit channels are first determined. The most reliable K channels are reserved for K information bits. A known bit value, e.g. 0, is assigned to other remaining N−K bit channels, which are frozen bits.

Figure 2:
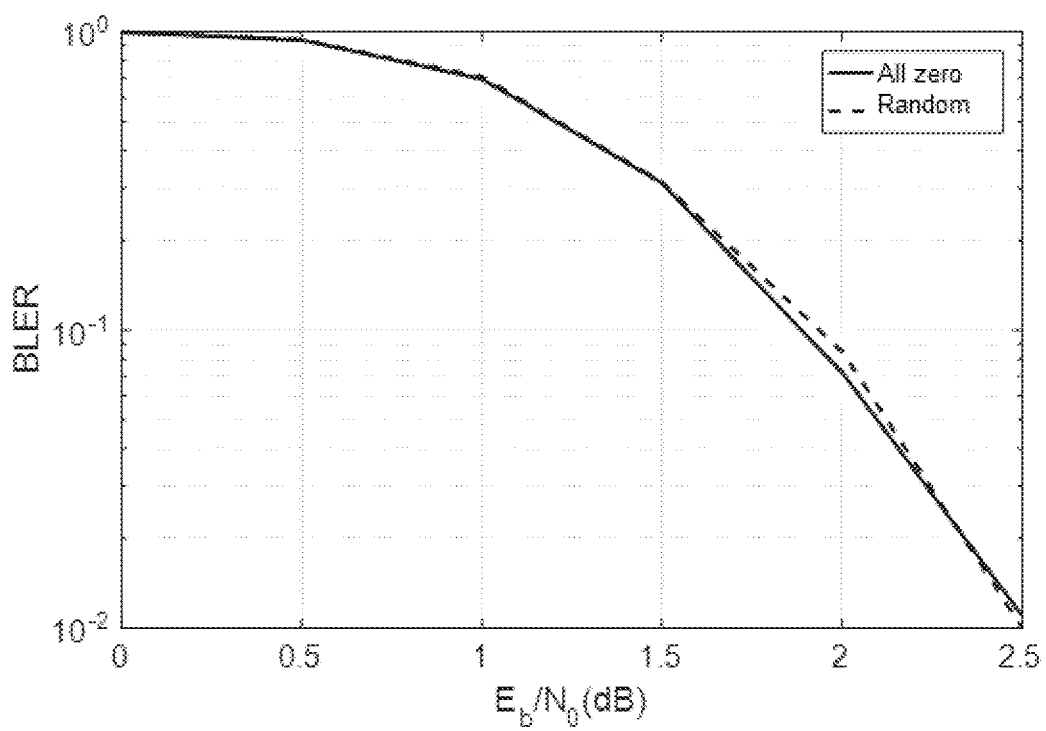
FIG. 2 is a graph that shows block error probabilities (BLER) of a polar code (1024,512) with all zero frozen bit pattern vector and a binary-valued random frozen bit pattern vector.

The frozen bits of a polar code might have any binary value and conventionally they are adjusted as zero. The frozen bit values of a polar code can be assigned a binary-valued frozen bit pattern vector of length at most N−K. The error correction capability of a polar code for given frozen bit locations is independent of the frozen bit pattern vector if the frozen bit locations and the frozen bit pattern vector are known by the polar decoder. FIG. 2 shows block error possibilities rates (BLER) of polar code (1024, 512) with all zero frozen bit pattern vector and a binary-valued random frozen bit pattern vector.

Various decoding methods are used for decoding polar codes. Exemplary decoding methods are Successive Cancelling (SC) and Successive Cancelling List (SCL) decoding.

2. Proposed Method

An uplink multiple access method is proposed for generating the transmitted signal of each user by means of transmitter of the present invention. This proposed method comprises a process step of providing binary-valued pattern sequence to be used in frozen bit locations during polar encoding. The method also comprises the process steps of performing channel encoding operation to information bits using a polar encoder, mapping coded bits to symbols to be transmitted and performing baseband-to-RF processing onto the symbol sequence to generate transmitted signal.

An uplink multiple access method for receiving and processing the superposed signals is proposed with receiver of the present invention. This proposed method comprises a process step of receiving superposed signal of multiple users transmitted through M uplink radio channels. The method also comprises the process steps of performing RF-to-baseband processing onto received signal and performing detection and decoding of each user data from baseband signal using an interference-cancellation multi-user detector and a polar decoder.

During polar encoding of the present invention binary-valued pattern sequence to be used in the frozen bit locations are determined based on the predetermined rules and protocols that are known by both the transmitter and the receiver units. Here, the length of pattern sequence is at most N−K when coded bit sequence length is N and uncoded information bit sequence length is K.

2.1. Transmitter

Figure 3A:
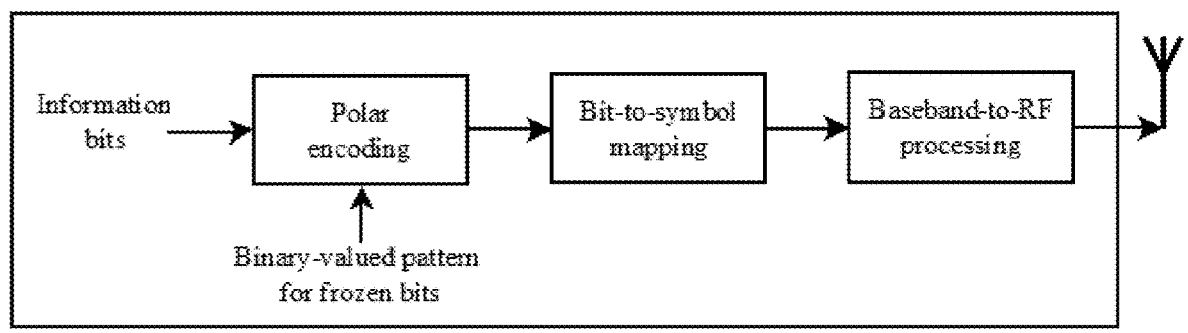
FIG. 3A is a schematic view of the signal processing in the transmitter embodiment of the present invention.

The generation procedure of the transmitted signals of each user for said uplink multiple access, is shown in FIG. 3A. The information bits shown herewith represent uncoded data bits coming from an information source in transmitter to be sent by each user. The information bits are first encoded by using a polar encoder and binary-valued, user-specific frozen bit patterns are used during encoding process in the frozen bit locations. The coded bits are mapped to the symbols to be transmitted and then baseband-to-RF processing on the symbol sequence is performed for the generation of the transmitted signal.

Figure 3B:
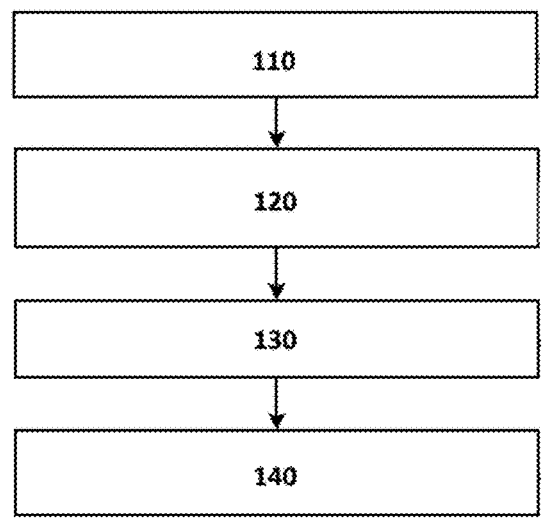
FIG. 3B is a flow chart that shows the processes in the transmitter embodiment of the present invention.
Figure 3C:
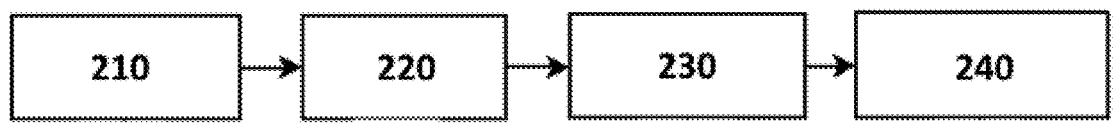
FIG. 3C is a schematic view that shows the modules included in the transmitter embodiment of the present invention.

The flow chart of the processes performed on the transmitter side of each user is shown in FIG. 3B. The modules included within each user's transmitter that uses the multiple access method disclosed herein this embodiment are given in FIG. 3C. The transmitter comprises a pattern generating module (210), channel encoding module (220), symbol mapping module (230) and a symbol transmitting module (240).

In the transmitter embodiment, the following process steps are performed respectively;
  pattern generating module (210) provides binary-valued pattern sequence to be used in frozen bit locations during polar encoding (110)
  channel encoding module (220) performs channel encoding operation to information bits using a polar encoder (120)
  symbol mapping module (230) maps coded bits to symbols to be transmitted (130)
  symbol transmitting module (240) performs baseband-to-RF processing onto the symbol sequence to generate transmitted signal (140).

2.1.1. Determining Information Bits and Frozen Bits

In the process step (110), the pattern generating module (210) generates binary-valued, user-specific pattern sequences to be used in frozen bit locations during polar encoding.

In another embodiment of the invention, each bit of binary valued pattern sequence to be used in frozen bit locations is generated according to Bernoulli distribution with parameter p, where $0 \leq p \leq 1$, $p \in \Re$. Wherein, p shows the probability of bit to be 1 and 1-p shows the probability of bit to be 0. The generated pattern sequence is stored in the transmitter to be processed during the channel encoding and receiver unit knows the pattern sequence explicitly. In another embodiment of the invention, binary valued pattern sequence to be used in frozen bit locations is selected among a preset generated pattern sequence table according to an index information sent from receiver unit.

2.1.2. Coding Information Bits

In the process step (120), the channel encoding module (220) first encodes the information bits by using a polar encoder and uses binary-valued, user-specific frozen bit patterns in frozen bit locations during encoding process. In an embodiment of the invention, information bits, depicted in FIG. 3A, are formed appending data bits coming from information source in transmitter and CRC-bits, which are generated according to a CRC-generating polynomial and the user data bits. The polynomial that produces CRC might be a user-specific polynomial or it might be a predetermined polynomial, same for each user.

In general, for $N=2^n$, coding process of the polar codes can be written in a vector matrix multiplication form as the following:

$$x = uG_N.$$

Herein, x is a binary-valued vector of length N carrying the coded bits, u is a binary-valued uncoded bit vector of length N carrying the information and frozen bits and $G_N$ is an N by N generator matrix. The location of the frozen bits in vector u is determined according to the preset rules. In an example of this embodiment, frozen bit locations are selected based on Monte-Carlo simulations using an all-frozen polar code and an SC decoder. In another example, frozen bit locations are selected by using Gaussian approximation method to approximate Bhattacharyya parameters of polarized channels. The information bit locations in the uncoded bit vector u are listed in set A and frozen bit locations in the uncoded bit vector u are listed in set $A^c$. Herein, it is defined as $A^c \cup A = \{0, \ldots, N-1\}$, and $A^c \cap A = \emptyset$.

In an embodiment of the invention, the generator matrix GN is defined as; GN=BNF$^{\otimes \, n}$, where $$F = \begin{bmatrix} 1 & 0 \\ 1 & 1 \end{bmatrix},$$

and F$^{\otimes \, n}$ is n$^{th}$ Kronecker power of kernel matrix F. The matrix BN is a N by N bit-reversal matrix for a vector of length N. Bit-reversal process can be described as follows: If the binary representation of an integer k∈{0, ..., N−1}, is denoted by $(i_0, \ldots, i_{n-1})$, the elements of vectors a and b of length N have the relation $a_{(i0, \ldots, \, in-1)} = b_{(in-1, \ldots, \, i0)}$ if a=bB$_N$.

In another embodiment of the invention, the encoding process is defined without bit-reversal operation such that GN=F$^{\otimes n}$.

An example polar encoder for bit-reversed polar encoding and N=8 is shown in FIG. 1.

2.1.3. Symbol Mapping

In the process step (130), the symbol mapping module (230) maps coded bits to symbols to be transmitted. The generated symbol sequence is a set of complex-valued numbers representing the baseband signal to be transmitted.

In an embodiment of the invention, this step comprises modulation operation. Herein, encoded bits are modulated using one of modulation schemes including but not limited to π/2 BPSK, BPSK, QPSK, π/4 QPSK, 16-QAM, 64-QAM, 256-QAM.

In another embodiment of the invention, this step comprises scrambling and modulation operations. Herein, the scrambling operation is applied to the coded bits by using preset pseudo-random scrambling sequences, and scrambling sequences might be user-specific sequences or might be a predefined sequence to be used by all users. The scrambled bits are modulated using one of the following modulation schemes including but not limited to, π/2 BPSK, BPSK, QPSK, π/4 QPSK, 16-QAM, 64-QAM, 256-QAM.

In yet another embodiment of the invention, this step comprises interleaving and modulation operations. Herein, the interleaving operation is applied to the coded bits using preset interleavers, and interleavers might be user-specific interleavers or might be a predefined interleaver to be used by all users. The interleaved bits are modulated by using one of modulation schemes including but not limited to π/2 BPSK, BPSK, QPSK, π/4 QPSK, 16-QAM, 64-QAM, 256-QAM.

2.1.4. Baseband RF Process

In the process step (140), symbol transmitting module (240) performs baseband-to-RF processing onto the symbol sequence to generate transmitted signal.

In an embodiment of the invention, this step comprises operations for the signal generation for single transmit antenna uplink transmission using a single-carrier modulation including but not limited to DFT-S-OFDM. In another embodiment of the invention, this step comprises operations for signal generation for single transmit antenna uplink transmission using an orthogonal multi-carrier modulation including but not limited to CP-OFDM. In yet another embodiment of the invention, this process comprises signal generation for single antenna uplink transmission using a non-orthogonal multi-carrier modulation including but not limited to f-OFDM, FBMC, UFMC. In yet another embodiment, this step comprises operations for the signal generation for spreading or repetition based multiple access methods including but not limited to CDMA, MUSA, RDMA.

Figure 4:
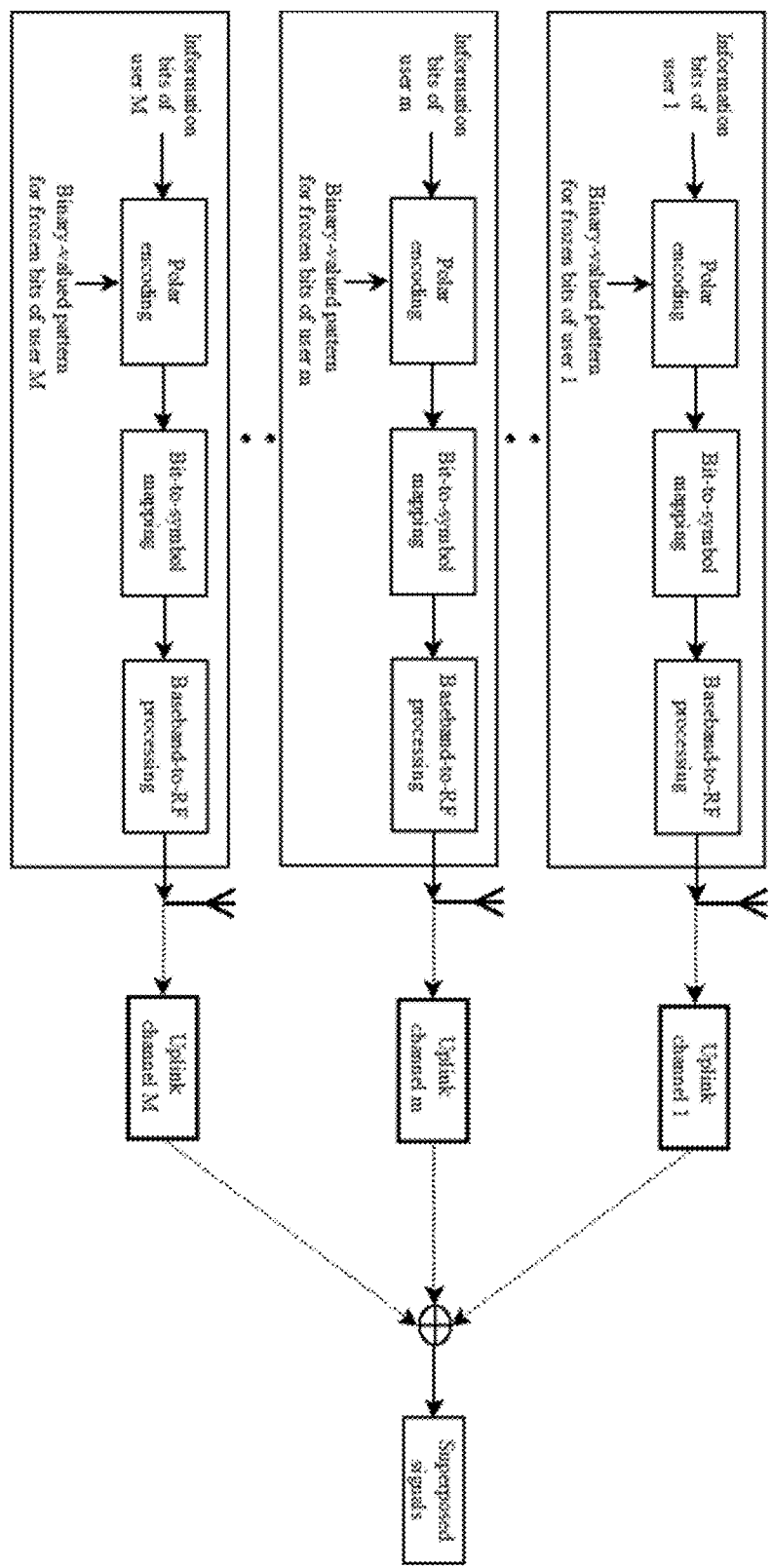
FIG. 4 is a schematic view that illustrates the superposition of the user signals in the transmitter embodiment of the present invention.

In the above described uplink multiple access method, each user transmits their respective signal using the same time-frequency resource and the receiver receives the superposed signal transmitted through relevant uplink channels given in FIG. 4. At the transmitter of each user, binary-valued pattern sequences are used in the frozen bit locations of the polar encoder and the coded bits are mapped to symbols and transmitted to the receiver. On account of the fact that signals of all users are transmitted in the same resource blocks, the receiver unit, by using the binary-valued pattern sequences in the frozen bit locations in the decoding process, identifies and decodes different user data. Despite multiuser interference, by using sufficiently low code rates R for each user and unique frozen bit pattern signatures, codewords of different users can be separated. As a result, more users than available orthogonal resource blocks can transmit their data to the receiver and the system can operate under overload.

2.2. Receiver

Figure 5A:
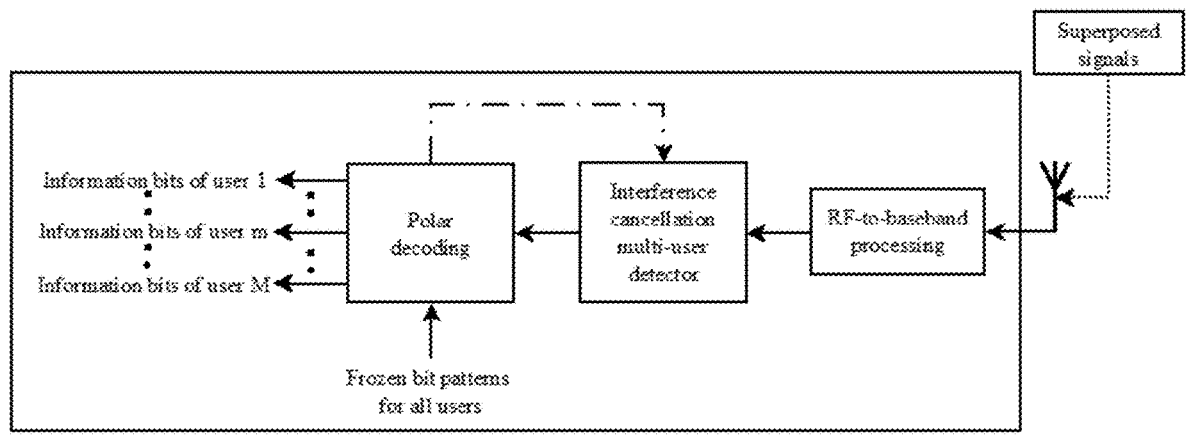
FIG. 5A is a schematic view of the signal processing in the receiver embodiment of the present invention.

In this section, receiver side of a multiple access method for uplink communication based on the frozen bit patterns of polar codes assigned to users is provided. The procedure to receive and process the received signal at the receiver is given in FIG. 5A. Herein, the receiver receives the superposed signal of M users transmitted through M uplink radio channels. An RF-to-baseband conversion is applied onto the received signal. Then, detection and decoding of each user data is performed using an interference cancellation multi-user detector and a polar decoder which employs corresponding binary-valued pattern sequences assigned to users to be used in frozen bit locations.

Figure 5B:
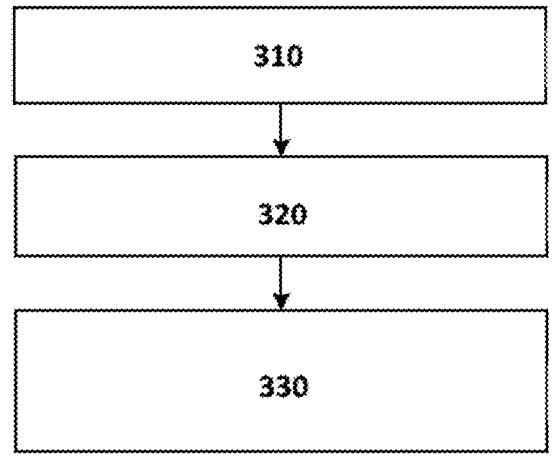
FIG. 5B is a flow chart that shows the processes in the receiver embodiment of the present invention.
Figure 5C:
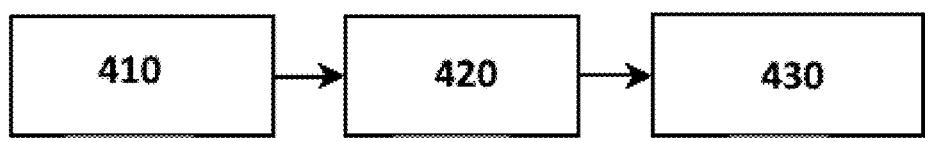
FIG. 5C is a schematic view that shows the modules included in the receiver embodiment of the present invention.

The flow chart of the processes performed at the receiver side of each user is given in FIG. 5B which includes steps (310)-(330). The modules included in this receiver embodiment, which is used for multiple access method for uplink communication based on user-specific binary-valued pattern sequence to be used in frozen bit locations of polar codes, are given in FIG. 5C. The receiver comprises a signal reception module (410), a baseband conversion module (420) and a signal detection module (430).

The following process steps are performed in the receiver embodiment respectively;

signal reception module (410) receives superposed signal of M users transmitted through M uplink radio channels where M>1 (310), baseband conversion module (420) performs RF-to-baseband processing onto received signal (320), signal detection module (430) performs detection and decoding of each user data from baseband signal using an interference-cancellation multi-user detector and a polar decoder (330).

2.2.1. Signal Reception

In the process step (310), the signal reception module (410) receives superposed signal of multiple M users transmitted by means of M number of uplink radio channels. Herein, the transmitted signals are generated in the transmitter of each user by employing user-specific binary-valued pattern sequences to be used in frozen bit locations in the polar encoder, mapping coded bits to symbols and performing baseband-to-RF processing.

2.2.2. RF-to-Baseband Conversion

In the process step (320), the baseband conversion module (420) performs RF-to-baseband processing onto received signal.

In one embodiment, this step includes the operations for obtaining baseband superposed received RF signal, where the received signal is the superposition of the signals transmitted from multiple transmitters. Herein, the transmitted signal from each transmitter is baseband-to-RF processed according to single transmit antenna uplink transmission using a single-carrier modulation including but not limited to DFT-S-OFDM. In another embodiment, the transmitted signal from each transmitter is baseband-to-RF processed according to single transmit antenna uplink transmission using an orthogonal multi-carrier modulation including but not limited to CP-OFDM. In yet another embodiment, the transmitted signal from each transmitter is baseband-to-RF processed according to single antenna uplink transmission using a non-orthogonal multi-carrier modulation including but not limited to f-OFDM, FBMC, UFMC. In another embodiment, this step includes operations for obtaining baseband superposed signal from received RF signal, where the received signal is the superposition of the signals transmitted from multiple transmitters. Herein, the transmitted signal from each transmitter is baseband-to-RF processed according to operations for signal generation for spreading or repetition based multiple access methods including but not limited to CDMA, MUSA, RDMA.

2.2.3. Signal Detection

In the process step (330), signal detection module (430) performs detection and decoding of each user data from baseband signal using an interference-cancellation multi-user detector and a polar decoder, which employs the corresponding binary-valued pattern sequences to be used in frozen bit locations. In one embodiment, the polar decoder included within the structure of the signal reception module (430) is a decoder that uses Successive Cancellation (SC)-based decoding algorithm. In an example, the SC-based decoding algorithm is SC decoding algorithm. In another example, the SC-based decoding algorithm is Successive Cancellation List (SCL) decoding algorithm. In yet another example, the SC-based decoding algorithm is Successive Cancellation Stack (SCS) decoding algorithm.

SC is a low complexity algorithm in which bits are decoded sequentially and one at a time. SC decoder takes channel observations, frozen bit locations and frozen bit values as inputs and calculates bit estimates. Channel observations can be taken as hard decisions (HD) or soft decisions (SD). In one embodiment, SD form is log-likelihood ratio (LLR) defined as:

$$\lambda = \frac{P(y \mid x = 0)}{P(y \mid x = 1)}$$

In SC decoding, bit decisions are made according to the following:

for $i = 0$ to $N - 1$ do if $i \in A^c$ then $\hat{u}_i \leftarrow u_i$ else if $\ln\left(\frac{W_N^{(i)}(y, u_0^{i-1} \mid u_i = 0)}{W_N^{(i)}(y, u_0^{i-1} \mid u_i = 1)}\right) \geq 0$ then $\hat{u}_i \leftarrow 0$ else $\hat{u}_i \leftarrow 1$ end end Herein, $u_i$ denotes the i-th uncoded bit, $\hat{u}_i$ denotes bit estimate for $u_i$ at the decoder output, $W_N^{(i)}(y, u_0^{i-1} \mid u_i = u)]$ is the conditional channel transition probability of polarized i-th bit channel. The likelihood functions $$\ln\left(\frac{W_N^{(i)}(y, u_0^{i-1} \mid u_i = 0)}{W_N^{(i)}(y, u_0^{i-1} \mid u_i = 1)}\right)$$

are calculated sequentially in SC decoding.

An SC decoder has a complexity order $O(N \log_2 N)$. A full parallel implementation of SC decoder has $2N-2$ latency.

In one embodiment, the polar decoder, which is included in the signal receiving module (430), is SCL decoder. SCL decoding algorithm is based on SC decoding algorithm. Although SCL decoders have higher complexity than SC decoders, they achieve better error performance than that of SC decoders. SCL decoders keep L paths during decoding to improve the error performance. The paths are formed during the decision-making stages of SC decoding, where a SC decoder makes a hard decision and a SCL decoder splits into alternative decision paths. When the number of paths exceed the maximum number of paths, which is L, the paths are eliminated according to a metric until L number of paths remain. The decision path is chosen among the L surviving paths at the end of decoding process according to the metric. Alternatively, a path that satisfies a CRC check is chosen as the decision path among the L surviving paths if polar code is concatenated with a CRC code.

In polar coding, frozen bit locations and frozen bit values should be identical in the polar encoder and the polar decoder to maximize the probability of obtaining the information bits correctly from a polar code codeword. A polar decoder cannot decode a polar code codeword correctly with the maximum probability that can be achieved if the correct frozen bit values are not known by polar decoder.

Codebooks of polar codes for given frozen bit locations are disjoint if the binary-valued pattern sequence to be used in frozen bit locations are different. An example is given for two different non-bit reversed polar codes with N=4. Frozen bit locations are set to be $A^c = \{0, 1\}$. Binary-valued pattern sequence to be used in the frozen bit locations for the first polar code is chosen as $[u_0 \ u_1] = [0 \ 0]$ and for it is chosen as $[u_0 \ u_1] = [0 \ 1]$ for the second polar code. Codebooks C1 and C2 for the example polar codes are given as:

$$[0 \ 0 \ u2 \ u3]\begin{bmatrix} 1 & 0 & 0 & 0 \\ 1 & 1 & 0 & 0 \\ 1 & 0 & 1 & 0 \\ 1 & 1 & 1 & 1 \end{bmatrix} \rightarrow C_1 = \left\{\begin{matrix} (0 & 0 & 0 & 0) \\ (1 & 1 & 1 & 1) \\ (1 & 0 & 1 & 0) \\ (0 & 1 & 0 & 1) \end{matrix}\right\}$$

$$[0 \ 1 \ u2 \ u3]\begin{bmatrix} 1 & 0 & 0 & 0 \\ 1 & 1 & 0 & 0 \\ 1 & 0 & 1 & 0 \\ 1 & 1 & 1 & 1 \end{bmatrix} \rightarrow C_2 = \left\{\begin{matrix} (1 & 1 & 0 & 0) \\ (0 & 0 & 1 & 1) \\ (0 & 1 & 1 & 0) \\ (1 & 0 & 0 & 1) \end{matrix}\right\}$$

In this embodiment, the polar decoder decodes the information bits for a user of interest by using inputs produced by the interference-cancellation multi-user detector, frozen bit locations and the binary-valued pattern sequence to be used in frozen bit locations for respective user. As a result, the probability of a polar decoder to decode information bits of a user of interest correctly is increased in the presence of multi-user interference from the codewords of other users.

In a preferred embodiment, interference cancellation multi-user detector uses Successive Interference Cancellation (SIC) algorithm. The receiver using SIC algorithm, detects and decodes the user signals sequentially. The receiver, in this embodiment, might determine the processing order of users according to a preset metric. In an exemplary embodiment, this metric is user SNR values. In another embodiment, this metric is user SINR values.

An SIC receiver detects and decodes signal of the first user according to processing order from received superposed signal. SIC receiver may reconstruct the signal of the first user by performing encoding, bit-to-symbol mapping and channel filtering (in the baseband) the output of the polar decoder after it is detected and decoded. Then, SIC receiver may subtract the reconstructed signal from the received superposed signal to obtain the intermediate received signal. In an exemplary embodiment, SIC receiver may choose not to reconstruct the signal of the first user according to a preset rule. An example of such a rule is CRC check performed over the decoded user bits if CRC code is employed.

After signal of first user is processed, a SIC receiver moves to second user in order and detects and decodes signal of second user. SIC receiver may reconstruct the signal of the second user after it is detected and decoded by encoding, bit-to-symbol mapping and channel filtering the decoder output. Then, SIC receiver may subtract the reconstructed signal from the intermediate received signal to obtain the new intermediate received signal. In an exemplary embodiment, SIC receiver may choose not to reconstruct the signal of the second user according to a preset rule. An example rule is CRC check performed over the decoded user bits if CRC code is employed After signal of second user is processed, SIC receiver moves to third user in order. SIC receiver performs identical operations for M users.

An SIC receiver continues its operation until all user signals are processed for at least one time. An SIC receiver may choose to continue or terminate its operation according to a preset rule after all user signals are processed for at least one time. In an exemplary embodiment, SIC processing terminates when maximum number of iterations is reached. Herein, a single iteration is assumed to be completed after all user signals are processed for exactly one time. Alternatively, if SIC receiver employs CRC check over the decoded user bits to decide to reconstruct the signal of the user, then SIC processing terminates when CRC checks for all users hold.

In one embodiment, the interference cancellation multi-user detector, which is included in the signal reception module (430), uses Parallel Interference Cancellation (PIC) algorithm. A PIC receiver detects and decodes user signals in parallel from received superposed signal. A PIC receiver may reconstruct the signals of the users after they are detected and decoded by encoding, bit-to-symbol mapping and channel filtering (in the baseband) the decoder outputs. Then, PIC receiver may subtract the reconstructed signals from the received superposed signal to obtain the residual received signal. PIC receiver may choose not to reconstruct the signal of the users according to a preset rule. An example rule is CRC check performed over the decoded user bits if CRC code is employed.

After signals of all users are processed, a PIC receiver may continue to iterations. At each parallel processing branch, reconstructed signal of the user of corresponding branch may be added back to residual received signal from previous iteration, and a PIC receiver detects and decodes user signals using this signal in parallel. PIC receiver may reconstruct the signals of the users at the second iteration after they are detected and decoded by encoding, bit-to-symbol mapping and channel filtering the decoder outputs. Then, PIC receiver may subtract the reconstructed signals from the received superposed signal to obtain the residual received signal. PIC receiver may choose not to reconstruct the signal of the users according to a preset rule. An example rule is CRC check performed over the decoded user bits if CRC code is employed PIC receiver may choose to continue or terminate its operation according to a preset rule after all user signals are processed for at least one time. In an exemplary embodiment, PIC processing terminates when maximum number of iterations is reached. Herein, a single iteration is assumed to be completed after all user signals are processed (in parallel) for exactly one time. Alternatively, if PIC receiver employs CRC check over the decoded user bits to decide to reconstruct the signal of the user, then PIC processing terminates when CRC checks for all users hold.

In an exemplary embodiment, the interference cancellation multi user detector, which is included within the signal reception module (430), signal processing blocks that produce inputs for a polar decoder to decode the information bits of each user in the system from superposed received signal or intermediate received signal.

In another preferred embodiment, the interference-cancellation multi-user detector contains a channel estimation block. Channel estimation is performed to estimate the physical radio channel that a user transmits it signal through. In an exemplary embodiment, channel estimation may be performed using transmitted pilot symbols that are known by the transmitter and receiver. In another example, a channel estimation may be performed over transmitted modulation symbols in the absence of transmitted pilot symbols that are known by the transmitter and receiver. An example channel estimation method is Minimum-Mean Square Error (MMSE) channel estimation. Another example channel estimation method is Least-Squares (LS) channel estimation.

In yet another embodiment, the interference-cancellation multi-user detector contains a frequency offset estimation block. Frequency offset estimation is performed to estimate the carrier frequency difference between the transmitter and receiver. In an exemplary embodiment, a frequency offset estimation may be performed using transmitted pilot symbols that are known by the transmitter and receiver. In another example, frequency offset estimation may be performed over transmitted modulation symbols in the absence of transmitted pilot symbols that are known by the transmitter and receiver. An example frequency offset estimation method is Maximum Likelihood (ML) frequency offset estimation.

In another embodiment, the interference-cancellation multi-user detector comprises of a filtering block. Filtering is performed on superposed received signal to suppress the interference of other user signals to the user signal of interest. In one example, filtering operation may be equalization. An example filter might be a Zero-Forcing (ZF) filter. Another example filter might be a Matched-Filter (MF). Another example filter might be a Minimum-Mean Square Error (MMSE) equalizer.

In yet another embodiment of the invention, the interference-cancellation multi-user detector comprises of a block to produce inputs for a polar decoder in the form of hard decisions (HD) or soft decisions (SD). HD inputs are binary-valued inputs obtained by processing-superposed received signal or intermediate received signal. SD inputs are real-valued inputs obtained by processing superposed received signal or intermediate received signal. An example SD input form is LLR. SD values might be quantized by Q bits in a hardware implementation.

In a preferred embodiment, M polar decoders may be employed at receiver to decode information bits for each user. Each of M polar decoders may be specialization to decode information bits of a specific user. Specialization of a polar decoder for a specific user is achieved by designing a polar decoder to use binary-valued pattern sequence of the specific user. Each of M polar decoders may be flexible decoders that can decode information bits of any user. A flexible polar decoder can decode information bits of any user if it is given the binary-valued pattern sequence of the specific user.

M polar decoders for each user are activated sequentially in a serially operating IC-based receiver. An example serially operating IC-based receiver is SIC receiver. M polar decoders for each user are activated in parallel in a parallel operating IC-based receiver. An example parallel operating IC-based receiver is PIC receiver. After information bits of a specific user are decoded, an IC-based receiver proceeds according to its algorithm.

In an exemplary embodiment, a single polar decoder may be employed at receiver to decode information bits for each user. A single polar decoder is a flexible decoder that can decode information bits of any user. A flexible polar decoder can decode information bits of any user if it is given the binary-valued pattern sequence of the specific user.

A single polar decoder is activated sequentially in a serially operating IC-based receiver. An example serially operating IC-based receiver is SIC receiver. A single polar decoder is activated sequentially in a parallel operating IC-based receiver. An example parallel operating IC-based receiver is PIC receiver. After information bits of a specific user are decoded, an IC-based receiver proceeds according to its algorithm.

Exemplary Implementation

In this section an example procedure to receive and process the superposed received signal of 3 users transmitted through 3 uplink radio channels is given. Herein, the transmitted signals are generated in the transmitter of each user by employing the user-specific binary-valued pattern sequence to be used in frozen bit locations of the polar encoder, mapping coded bits to symbols and performing baseband-to-RF-processing. Signal of all users are transmitted in the same resource blocks. Example includes a CRC-aided SIC receiver with SCL decoding with list size L.

The superposed signal is received, and RF-to-baseband processing is applied. A baseband received signal at the receiver is denoted by y. y is superposition of signals of 3 users transmitted through 3 channels. 3 users are ordered according to their SINR values in interference-cancellation multi-user detector. Ordered user indexes are denoted by (i1, i2, i3).

A block in interference-cancellation multi-user detector produces inputs for a polar decoder in the form of SD and provides LLR values calculated from y for user i1. Receiver provides frozen bit locations and binary-valued pattern sequence to be used in frozen bit locations for user i1. A flexible SCL decoder takes LLR values for user i1, frozen bit locations for user i1, and binary-valued pattern sequence for user i1 as inputs. A flexible SCL decoder outputs L binary vectors $(\tilde{u}_{i1,j}, j \in \{0, 1, \ldots, L-1\})$. L binary vectors $(\tilde{u}_{i1,j})$ contain information bit vector candidates for the user i1. A CRC check is performed over information bits in L binary vectors $(\tilde{u}_{i1,j})$ for the user i1. CRC check holds for one information bit vector candidate $(\tilde{u}_{i1,d})$. Information bits for user i1 are copied and stored from information bit vector candidate $(\tilde{u}_{i1,d})$.

The received signal of user i1 is reconstructed. Uncoded bit vector for user i1 is reconstructed using binary-valued pattern sequence for user i1 and information bit vector candidate $\tilde{u}_{i1,d}$ for user i1. Reconstructed uncoded bit vector for user i1 is denoted by $\bar{u}_{i1}$. Coded bit vector for user i1 is reconstructed by encoding $\bar{u}_{i1}$. Reconstructed coded bit vector for user i1 is denoted by $\bar{x}_{i1}$. Bit-to-symbol mapped signal for user i1 is reconstructed by bit-to-symbol mapping $\bar{x}_{i1}$. Reconstructed bit-to-symbol mapped signal for user i1 is denoted by $\bar{s}_{i1}$. Received signal for user i1 is reconstructed by applying channel filter to $\bar{s}_{i1}$. Reconstructed received signal for user i1 is denoted by $\bar{y}_{i1}$. An intermediate received signal is formed by subtracting $\bar{y}_{i1}$ from y. An intermediate received signal is denoted by y'.

A block in interference-cancellation multi-user detector provides LLR values calculated from y' for user i2. Receiver provides frozen bit locations and binary-valued pattern sequence to be used in frozen bit locations for user i2. A flexible SCL decoder takes LLR values for user i2, frozen bit locations for user i2, and binary-valued pattern sequence for user i2 as inputs. A flexible SCL decoder outputs L binary vectors $\tilde{u}_{i2,j}, j \in \{0, 1, \ldots, L-1\}$. L binary vectors $\tilde{u}_{i2,j}$ contain information bit vector candidates for user i2. A CRC check is performed over information bits in L binary vectors $\tilde{u}_{i2,j}$ for user i2. CRC check holds for no information bit vector candidates. Information bits are not stored for user i2. The received signal of user i2 is not reconstructed.

A block in interference-cancellation multi-user detector provides LLR values calculated from y' for user i3. Receiver provides frozen bit locations and binary-valued pattern sequence to be used in frozen bit locations for user i3. A flexible SCL decoder takes LLR values for user i3, frozen bit locations for user i3, and binary-valued pattern sequence for user i3 as inputs. A flexible SCL decoder outputs L binary vectors $\tilde{u}_{i3,j}, j \in \{0, 1, \ldots, L-1\}$. L binary vectors $\tilde{u}_{i3,j}$ contain information bit vector candidates for user i3. A CRC check is performed over information bits in L binary vectors $\tilde{u}_{i3,j}$ for user i3. CRC check holds for one information bit vector candidate, $\tilde{u}_{i3,d}$. Information bits for user i3 are copied and stored from information bit vector candidate $\tilde{u}_{i3,d}$.

The received signal of user i3 is reconstructed. Uncoded bit vector for user i3 is reconstructed using binary-valued pattern sequence for user i3 and information bit vector candidate $\tilde{u}_{i3,d}$ for user i1. Reconstructed uncoded bit vector for user i3 is denoted by $\bar{u}_{i3}$. Coded bit vector for user i3 is reconstructed by encoding $\bar{u}_{i3}$. Reconstructed coded bit vector for user i3 is denoted by $\bar{x}_{i3}$. Bit-to-symbol mapped signal for user i3 is reconstructed by bit-to-symbol mapping v. Reconstructed bit-to-symbol mapped signal for user i3 is denoted by $\bar{s}_{i3}$. Received signal for user i3 is reconstructed by applying channel filter to $\bar{s}_{i3}$. Reconstructed received signal for user i3 is denoted by $\bar{y}_{i3}$. An intermediate received signal is formed by subtracting $\bar{y}_{i3}$ from y'. An intermediate received signal is denoted by y'.

A block in interference-cancellation multi-user detector provides provides LLR values from for user i2. Receiver provides frozen bit locations and binary-valued pattern sequence to be used in frozen bit locations for user i2. A flexible SCL decoder takes LLR values for user i2, frozen bit locations for user i2, and binary-valued pattern sequence for user i2 as inputs. A flexible SCL decoder outputs L binary vectors $\tilde{u}_{i2,j}, j \in \{0, 1, \ldots, L-1\}$. L binary vectors $\tilde{u}_{i2,j}$ contain information bit vector candidates for user i2. A CRC check is performed over information bits in L binary vectors $\tilde{u}_{i2,j}$ for user i2. CRC check holds for one information bit vector candidate, $\tilde{u}_{i2,d}$. Information bits for user i3 are copied and stored from information bit vector candidate $\tilde{u}_{i2,d}$.

4. Result

Figure 6:
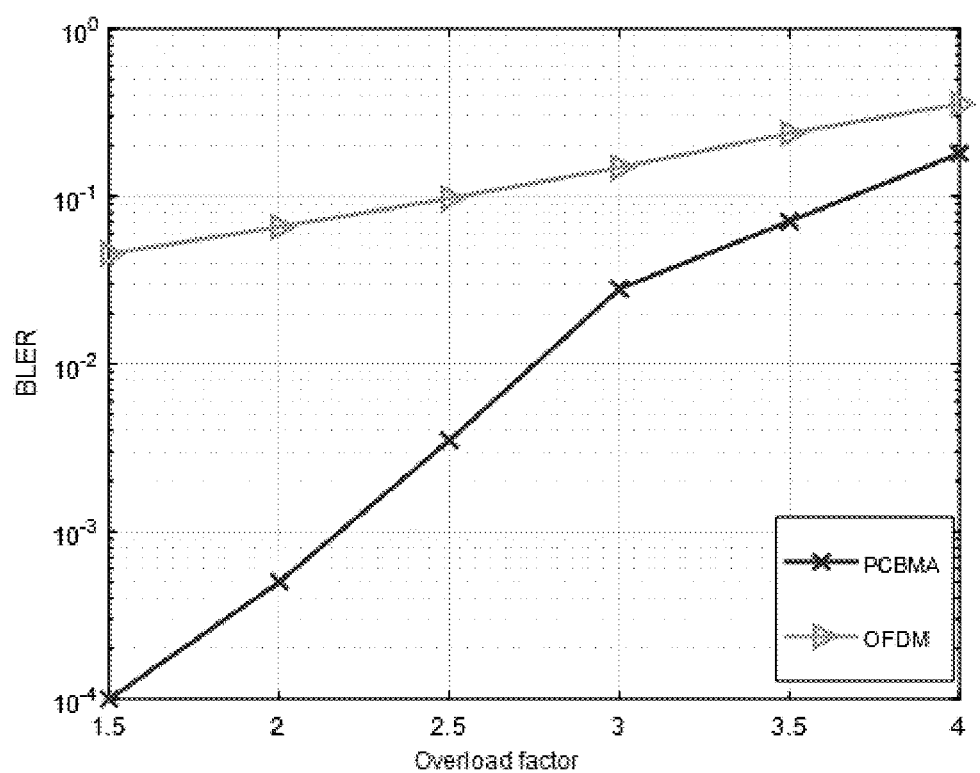
FIG. 6 is a graph that shows the BLER performance with respect to overload factor where overloaded OFDM method is compared to uplink multiple access method of the present invention.

FIG. 6 compares the block error rate performances of overloaded OFDM and uplink multiple access method based on frozen bit patterns of polar codes described in the present disclosure with respect to overload factor. Overload factor is defined as the ratio of the number of users to the number of resource blocks. Overloaded OFDM uses all-zero frozen bit pattern vectors for all users. Uplink multiple access method based on frozen bit patterns of polar codes uses randomly generated binary-valued pattern sequences for each user. 4 consecutive OFDM symbols with 256 subcarriers are transmitted in both schemes. Each user has different binary-valued pattern sequences. A (2048,256) polar code is employed. A CRC code of length-16 is concatenated with polar code at transmitter. A CRC-based SIC receiver is employed at receiver. A SCL decoder with L=16 is employed at receiver. As can be seen in FIG. 6, a higher performance is provided with the method of the present invention than the overloaded OFDM method.

What is claimed is:

1. An uplink multiple access method based on user-specific frozen bit patterns of polar codes, wherein a binary-valued pattern sequence to be used in frozen bit locations is determined based on preset rules and protocols known to transmitter units and a receiver unit and wherein a length of the binary-valued pattern sequence is at most N−K, where K is an integer representing a length of an uncoded information bit sequence and N is an integer representing a length of a coded bit sequence, wherein, a transmitter signal generation comprises process steps of:

providing the binary-valued pattern sequence to be used in the frozen bit locations during a polar encoding operation;

performing a channel encoding operation to information bits using a polar encoder, wherein binary-valued, user-specific frozen bit patterns are used in frozen bit locations during the channel encoding operation;

mapping coded bits to symbols to be transmitted, wherein a generated symbol sequence is a set of complex-valued number representing a baseband signal to be transmitted;

performing a baseband-to-RF processing onto the generated symbol sequence to generate a transmitted signal;

wherein each bit of the binary-valued pattern sequence to be used in the frozen bit locations is generated according to a Bernoulli distribution, with parameter p, wherein p is a real number such that $0 \le p \le 1$, wherein, p represents a probability of a value of a bit equal to 1 and 1-p is a probability of a value of a bit equal to 0; and storing the generated symbol sequence at the transmitter units and the receiver unit, in the step of providing the binary-valued pattern sequence to be used in the frozen bit locations during the polar encoding.

2. The uplink multiple access method according to claim 1; wherein the binary-valued pattern sequence to be used in the frozen bit locations is selected from a preset generated pattern sequence table according to an index information sent from the receiver unit, in the step of providing the binary-valued pattern sequence to be used in the frozen bit locations during the polar encoding operation.

* * * * *